United States Patent

Mitchell

Patent Number: 5,106,916
Date of Patent: Apr. 21, 1992

[54] PROCESS FOR THE PREPARATION OF GRAFTED POLYMERS OF IMPROVED COLOR

[75] Inventor: David J. Mitchell, Kingston, Canada

[73] Assignee: Du Pont Canada Inc., Mississauga, Canada

[21] Appl. No.: 421,770

[22] Filed: Oct. 16, 1989

[30] Foreign Application Priority Data

Oct. 19, 1988 [GB] United Kingdom ............. 8824441
Aug. 23, 1989 [GB] United Kingdom ............. 8919149

[51] Int. Cl.$^5$ .................. C08F 4/36; C08F 255/02; C08F 265/04
[52] U.S. Cl. .................. 525/255; 525/263; 525/265; 525/285; 525/302; 525/539
[58] Field of Search ......... 525/255, 263, 265, 285, 525/302, 539

[56] References Cited

U.S. PATENT DOCUMENTS

| | | | |
|---|---|---|---|
| 3,917,745 | 11/1975 | D'Angelo | 525/255 |
| 4,006,201 | 2/1977 | Bauer | 525/255 |
| 4,066,608 | 1/1978 | Van Brederode | 260/42.18 |
| 4,187,202 | 2/1980 | Kondo | 525/255 |
| 4,602,056 | 7/1986 | Waniczek et al. | 524/272 |

FOREIGN PATENT DOCUMENTS

| | | | |
|---|---|---|---|
| 160984 | 11/1985 | European Pat. Off. | |
| 0266994 | 5/1988 | European Pat. Off. | |
| 280454 | 8/1988 | European Pat. Off. | |
| 0012382 | 2/1981 | Japan | 525/255 |
| 57-030745 | 2/1982 | Japan | |
| 59-024665 | 2/1984 | Japan | |
| 59-055743 | 3/1984 | Japan | |
| 59-152852 | 8/1984 | Japan | |
| 59-229338 | 12/1984 | Japan | |
| 2035331 | 6/1980 | United Kingdom | 525/255 |

*Primary Examiner*—John C. Bleutge
*Assistant Examiner*—Vasu S. Jagannathan

[57] ABSTRACT

This invention relates to a process for the catalytic grafting of an ethylenically unsaturated monomer onto a copolymer in the presence of a catalyst. The monomer is selected from the group consisting of ethylenically unsaturated carboxylic acids, anhydrides esters and other derivatives thereof. The copolymer is selected from the group consisting of certain copolymers of ethylene and ionomers of such copolymers. The catalyst is a mixture of (a) a certain amount of water and (b) at least one of certain phosphorus-containing compounds. The process comprises admixing copolymer, monomer, catalyst and an organic peroxide at a temperature above the melting point of the copolymer for a period of time so as to obtain a uniform distribution of monomer, catalyst and peroxide in the copolymer. The resultant grafted copolymer has improved color, and is useful in adhesive systems and as a compatibilizer for polymers and other materials.

18 Claims, No Drawings

PROCESS FOR THE PREPARATION OF GRAFTED POLYMERS OF IMPROVED COLOR

The present invention relates to a catalyzed process for the grafting of ethylenically unsaturated monomers onto polymers and especially to the grafting of such monomers onto copolymers of ethylene and ethylenically unsaturated carboxylic acids or derivatives thereof. In particular, the invention relates to such a process in which the grafted polymer is obtained in higher yield and with improved colour.

Copolymers of ethylene with unsaturated carboxylic acid and ester monomers, are known and include ethylene/vinyl acetate copolymers, ethylene/(meth)acrylate copolymers and ethylene/(meth)acrylic acid copolymers. Such copolymers have a variety of end-uses and in embodiments are used in the manufacture of adhesives, as coatings and in the form of blends with other polymers e.g. polyolefins.

It is known that the properties of polyolefins may be modified by the grafting of ethylenically unsaturated carboxylic acids and anhydrides onto hydrocarbon alpha-olefins. Published European patent application No. 0 266 994 of P. C. Wong, published May 11, 1988, discloses a process for the melt grafting of an ethylenically unsaturated monomer onto a copolymer. In the process, an admixture of the copolymer, monomer and an organic peroxide is mixed in an extruder at a temperature above the melting point of the copolymer for a period of time that is at least four times the half-life of the organic peroxide. The resultant grafted copolymer is extruded into a shaped article. The preferred monomers are maleic acid and maleic anhydride. Japanese patent application No. 57 030 745 of Toyo Soda, published Feb. 19, 1982 discloses blends of (a) phenol resin and (b) carboxyl-modified ethylene/vinyl acetate copolymer that preferably is prepared by reacting 100 parts by weight of ethylene/vinyl acetate copolymer with alpha, beta unsaturated carboxylic acid or anhydride under melt conditions in the presence of 0.001-1 parts by weight of a radical initiator e.g. di-tert. butyl peroxide or tert.butyl peracetate.

The use of copolymers, including graft copolymers, of ethylene and ethylenically unsaturated carboxylic acids and anhydrides in film laminates is known. For example, European patent application No. 160 984-A of Kuraray K. K., published November 13, 1985, describes such a use of ethylene/acrylate ester/ethylenically unsaturated carboxylic acid and anhydride copolymers. The use of copolymers of (meth)acrylate esters and ethylenically unsaturated acids or anhydrides is disclosed in Japanese patent application No. 59 152 852 of Kuraray K. K., published Aug. 31, 1984, and the use of the related copolymers of ethylene/vinyl acetate is disclosed in Japanese patent applications No. 59 229 338 of Kuraray K. K. and No. 59 024 665 of Dainippon Printing K. K., published June 10, 1983 and Feb. 8, 1984 respectively. Hot melt adhesives, formed from ethylene/vinyl acetate copolymers that have been peroxygenated with atmospheric oxygen and then grafted with methacrylic acid units, are disclosed in U.S. Pat. No. 4,602,056 of H. Waniczek et al., which reissued July 22, 1986. The production of laminates using ethylene/vinyl acetate copolymers graft-modified with unsaturated carboxylic acid or anhydrides is disclosed in Japanese patent application No. 59 055 743 of Mitsubishi Petrochemical Co. Limited, published Mar. 30, 1984.

It is important in the grafting of monomers onto polymers that a uniform product be obtained. Furthermore, it is important that the grafted polymer be of a commercially-acceptable colour, especially if the grafted product is to be used in association with clear or lightly coloured materials e.g. as an adhesive in the bonding or laminating of clear thermoplastic films. However, the grafting of monomers onto copolymers of ethylene and ethylenically unsaturated carboxylic acids or derivatives thereof tends to result in significant increases in the colour of the product.

A process has now been found for the grafting, in the presence of a catalyst, of ethylenically unsaturated carboxylic acids and anhydrides onto copolymers of ethylene and ethylenically unsaturated carboxylic acids or derivatives thereof, in a manner that produces grafted copolymers in higher yields and with improved colour.

Accordingly, the present invention provides a process for the grafting of ethylenically unsaturated monomers onto a copolymer in the presence of a catalyst, said monomers being selected from the group consisting of ethylenically unsaturated carboxylic acids, anhydrides, esters and other derivatives thereof, and mixtures thereof, said copolymer being selected from the group consisting of copolymers of ethylene with at least one monomer selected from the group consisting of vinyl alkanoates, carbon monoxide, acrylic acid, methacrylic acid, acrylate esters and methacrylate esters, and mixtures thereof, and ionomers of such copolymers, and said catalyst being comprised of a mixture of (a) water and (b) at least one phosphorus-containing compound selected from the group consisting of (i) phosphorus compounds of the formula $HPO(OR_1)_2$, where each $R_1$ is independently selected from H, alkyl, aryl and alkaryl, (ii) phosphite compounds of the formula $P(OR_2)_3$, where each $R_2$ is independently selected from alkyl, aryl and alkaryl, (iii) phosphite compounds of the formula $(OR_3)_2P-O-R_4-O-P(OR_5)_2$, where each of $R_3$, $R_4$ and $R_5$ is independently selected from alkyl, aryl and alkaryl, and (iv) di-substituted pentaerythritol diphosphites of the formula $(R_6O)P-O_2-RPEO_2-P-(OR_7)$, where each of $R_6$ and $R_7$ is independently selected from alkyl, aryl and alkaryl and $O_2R_{PE}O_2$ represents the pentaerythritol moiety, the amount of water being about 0.01-10 parts by weight per part of phosphorus-containing compound, with the proviso that if the phosphorus-containing compound is phosphorous acid then the amount of water is 0.001-10 parts, said process comprising:

(i) admixing copolymer, monomer, at least 15 ppm of catalyst and 25-5000 ppm of an organic peroxide having a half-life of from about 1 minute to about 120 minutes at 150° C., at a temperature above the melting point of said copolymer for a period of time that is at least 4 times the half-life of the organic peroxide so as to obtain a uniform distribution of monomer, catalyst and peroxide in the copolymer;

(ii) extruding the resultant grafted copolymer into a shaped article.

In preferred embodiments of the process of the present invention, the ethylenically unsaturated acid and anhydride are maleic acid and maleic anhydride, respectively, and the catalyst is phosphorous acid.

In a further embodiment, the catalyst is in the form of a concentrate in a polymer, said polymer being compatible with the copolymer.

In addition, the present invention provides a grafted copolymer composition having 0.5 to 5% by weight of monomer grafted thereon, said copolymer being selected from the group consisting of copolymers of ethylene with at least one monomer selected from the group consisting of vinyl alknaoates, carbon monoxide, acrylic acid, methacrylic acid, acrylate esters and methacrylate esters, and mixtures thereof, and ionomers of such copolymers, and said monomer being selected from the group consisting of ethylenically unsaturated carboxylic acids, anhydrides, esters and other derivatives thereof, and mixtures thereof, said grafted polymer having a melt index that is 20-140% of the melt index of the copolymer prior to grafting, said grafted copolymer having been formed by grafting the monomer onto molten copolymer in the presence of 25-5000 ppm of an organic peroxide having a half-life of from about 1 minute to about 120 minutes at 150° C. and at least 15 ppm of a catalyst comprised of a mixture of (a) water and (b) at least one phosphorus-containing compound selected from the group consisting of (i) phosphorus compounds of the formula $HPO(OR_1)_2$, where each $R_1$ is independently selected from H, alkyl, aryl and alkaryl, (ii) phosphite compounds of the formula $P(OR_2)_3$, where each $R_2$ is independently selected from alkyl, aryl and alkaryl, (iii) phosphite compounds of the formula $(OR_3)_2P—O—R_4—O—P(OR_5)_2$, where each of $R_3$, $R_4$ and $R_5$ is independently selected from alkyl, aryl and alkaryl, and (iv) di-substituted pentaerythritol diphosphites of the formula $(R_6O)—O_2R_{PE}O_2—P—(OR_7)$, where each of $R_6$ and $R_7$ is independently selected from alkyl, aryl alkaryl and $O_2R_{PE}O_2$ represents the pentaerythritol moiety, the amount of water being about 0.01-10 parts by weight per part of phosphorus-containing compound, with the proviso that if the phosphorus-containing compound is phosphorous acid then the amount of water is 0.001-10 parts.

The copolymer that is subjected to the process of the present invention may be a copolymer of ethylene and a vinyl alkanoate, especially ethylene/vinyl acetate copolymers. Alternatively, the copolymer may be a copolymer of ethylene and an acrylate ester, examples of which are ethylene/ethyl acrylate copolymers, ethylene/methyl acrylate copolymers and ethylene/butyl acrylate copolymers. Similarly, the copolymer may also be a copolymer of ethylene and a methacrylate ester e.g. ethylene/methyl methacrylate. Other copolymers include copolymers of ethylene with acrylic acid or methacrylic acid, and analogous ionomers viz. copolymers having the acid groups thereof partially neutralized by metals especially with sodium, zinc or aluminum. Additionally, the copolymer may be a copolymer of ethylene with carbon monoxide, optionally also with one of the aforementioned monomers, examples of which are ethylene/carbon monoxide, ethylene/butyl acrylate/carbon monoxide, and ethylene/vinyl acetate/carbon monoxide copolymers. Such copolymers are known in the art and many examples thereof are available commercially.

The copolymers may have a relatively high ethylene content, and tend to be non-tacky copolymers, or lower ethylene contents, and tend to be relatively tacky copolymers. The latter include copolymers that in pellet form tend to agglomerate. In addition, the copolymers are available in a variety of molecular weights, which is usually expressed in terms of melt index. Melt index is measured by the procedure of ASTM D-1238 (condition E). The nature of the copolymer, especially with respect to ethylene content and molecular weight, that is subjected to the process of the present invention will depend in particular on the intended end-use of the grafted copolymer that is obtained from the process. Copolymers having a wide variety of properties may be subjected to the process described herein.

The organic peroxides used in the process of the present invention have a half-life at 150° C. of from about one minute to about 120 minutes. The organic peroxide, which as used herein includes hydroperoxides, may for example be a peroxy ester, bis(tert. alkyl peroxy alkyl) benzene, dicumyl peroxide or acetylenic diperoxy compound. Other organic peroxides are known to those skilled in the art, including t-butyl hydroperoxide and di-t-butyl peroxide. Preferred organic peroxides are 2,5-dimethyl-2,5-di(t-butyl peroxy) hexane and 2,5-dimethyl-2,5-di(t-butyl peroxy) hexyne-3 which are available under the trade marks Lupersol 101 and Lupersol 130, respectively, from Lucidol Division of Pennwalt Corporation.

The grafting monomer is selected from the group consisting of ethylenically unsaturated carboxylic acids and ethylenically unsaturated carboxylic acid anhydrides, including derivatives of such acids, and mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride or citraconic anhydride, nadic anhydride, nadic methyl anhydride and tetrahydro phthalic anhydride. Examples of derivatives of the unsaturated acids are salts, amides, imides and esters e.g. mono- and disodium maleate, acrylamide, maleimide, glycidyl methacrylate and diethyl fumarate.

The amount of organic peroxide will depend in particular on the characteristics of the copolymer but will be in the range of 25-5000 ppm, especially 100-2500 ppm and particularly in the range of 500-2000 ppm, based on the weight of the copolymer in the admixture fed to the extruder. It is an important characteristic of the present invention that low levels of organic peroxide may be used, while still effecting high levels of grafting. Such low levels result in relatively small changes in the properties of the copolymer, especially relatively small changes in the melt index thereof on extruding the polymer mixture.

The amount of monomer will depend in particular on the reactivity of the monomer and the level of grafting that is to be achieved. For example, if the monomer is maleic anhydride, the amount of monomer may be as high as about 5%, especially 0.1-3%, by weight of the copolymer, and particularly in the range of 0.2-2% by weight. With other monomers, different amounts of monomer may be preferred.

The catalyst composition comprises a mixture of (a) water and (b) at least one phosphorus-containing compound selected from the group consisting of (i) phosphorus compounds of the formula $HPO(OR_1)_2$, where each $R_1$ is independently selected from H, alkyl, aryl and alkaryl, (ii) phosphite compounds of the formula $P(OR_2)_3$, where each $R_2$ is independently selected from alkyl, aryl and alkaryl, (iii) phosphite compounds of the formula $(OR_3)_2P—O—R_4—O—P(OR_5)_2$, where each of $R_3$, $R_4$ and $R_5$ is independently selected from alkyl, aryl and alkaryl, and (iv) di-substituted pentaerythritol diphosphites of the formula $(R_6O)P—O_2R_{PE}O_2—P(OR_7)$, where each of $R_6$ and $R_7$ is independently selected from alkyl, aryl and alkaryl and $O_2R_{PE}O_2$ represents the pentaerythritol moiety. It is to be understood that in embodiments, the substituents, especially $R_4$, may contain oxygen atoms e.g. oxygen atoms in the form of ether linkages. The amount of water required in the mixture ranges from about 0.01-10 parts by weight per part of phosphorus-containing compound, especially 0.02-1 parts by weight, and particularly in the range 0.03-0.5 parts, with the proviso that if the phosphorus-containing compound is phosphorous acid then the amount of water may be 0.001-10 parts.

The amount of catalyst will depend in particular on the characteristics of the phosphorus-containing compound, but will be at least 15, especially at least 60 ppm and in particular at least 120 ppm. High levels of catalyst may be used e.g. up to 5000 ppm or higher, but in preferred embodiments the amount of catalyst is in the range of 100-1000 ppm. The amount of water required may also depend on the characteristics of the phosphorus-containing compound, with some compounds requiring higher amounts of water to be effective.

It will be understood by those skilled in the art that some additives may have detrimental effects on the grafting process and for that reason it may be preferable not to use certain combinations of additives.

The compositions may be fed to the extruder in a number of ways. For example, the copolymer may be fed to the extruder and heated to a molten condition. The organic peroxide, grafting monomer and catalyst may then be fed directly into the molten copolymer, at the same or at separate addition ports of the extruder. Alternatively, one or more of the organic peroxide, grafting monomer and catalyst may be fed to the extruder simultaneously with the copolymer, especially the organic peroxide; feeding to the extruder in this manner permits dispersion of, in particular, the peroxide in the copolymer prior to contact of the organic peroxide and grafting monomer, thereby facilitating production of grafted copolymer of more uniform properties. For example, one or more of the organic peroxide, grafting monomer and catalyst may be fed to the extruder in the form of concentrates in a suitable carrier polymer. In a further alternative embodiment, one or more of the organic peroxide, grafting monomer and catalyst are fed to the extruder with the copolymer by spraying or otherwise admixing such materials with the copolymer. In a preferred embodiment of the process of the present invention, the organic peroxide and catalyst are in the form of concentrates in a carrier polymer and are fed to the extruder with the copolymer.

The catalyst mixtures may be prepared in a number of ways. For example, the water and phosphorus-containing compound may be admixed to form a solution which is subsequently fed to the extruder. Alternatively, the water/phosphorus-containing compound mixture may be in a different physical form e.g. a suspension or solid, which may also be fed to the extruder. In a second embodiment, the phosphorus-containing compound is blended into a carrier polymer in the form of a concentrate, with the water component added, either to the concentrate along with the phosphorus-containing compound before blending or subsequent to the blending, by absorption.

The process of the present invention may be used to produce compositions of monomer grafted onto the copolymers that have improved colour. The shaped articles produced by the process of the present invention will usually be pellets or other comminuted shapes, but are not restricted thereto. The grafted polymers may be used as such or as blends with other polymers, especially in the form of adhesive compositions for use with polymers and/or metals, in co-extrusion of multiple layer structures, in coating compositions, as compatibilizers in filled compositions and to improve the dyeability and paintability of polymers.

The present invention is illustrated by the following examples.

EXAMPLE I

An admixture was formed of an ethylene/vinyl acetate copolymer having a vinyl acetate content of 9% by weight and a melt index of 2.0 dg/min, an organic peroxide and maleic anhydride. The organic peroxide was Lupersol 101 and was added in the form of a concentrate in the above ethylene/vinyl acetate copolymer such that the admixture contained 1000 ppm of the organic peroxide. The maleic anhydride was added directly into the first zone of the extruder, in an amount of 1.5% by weight of the copolymer. A variety of catalysts were added in the form of pellet concentrates, the carrier polymer of the concentrates being the above ethylene/vinyl acetate copolymer; in comparative runs, catalyst was not added. These concentrates were prepared by melt blending 5% of the phosphorus-containing compound into the carrier polymer, and then allowing 1000-2000 ppm (carrier polymer basis) of water to absorb into the concentrate over a period of three days.

The resultant admixture was blended in an extruder and then extruded into water in the form of a strand and then pelletized. The colour of the pellets was measured using a Hunter* L,a,b colorimeter, the measurement being made on the pellets. The melt index and yellowness index of the grafted copolymer were measured using the procedure of ASTM D-1238 (Condition E) and ASTM D-1925-70, respectively.

The results obtained are given in Table I.

TABLE I

| Run No. | Graft Amount (%) | Graft Yield (%) | Melt Index dg/min | Catalyst | Catalyst Amount (ppm) | Yellowness Index |
|---|---|---|---|---|---|---|
| 1* | 0.81 | 54 | 1.46 | — | — | 36.5 |
| 2 | 1.06 | 71 | 0.66 | A | 1000 | 4.9 |
| 3* | 0.85 | 57 | 1.38 | — | — | 34.3 |
| 4 | 1.22 | 81 | 0.79 | B | 1100 | 7.7 |
| 5* | 1.05 | 70 | 1.35 | — | — | 44.7 |
| 6 | 1.24 | 83 | 1.10 | C | 1000 | 11.3 |
| 7* | 1.00 | 67 | 1.27 | — | — | 38.9 |
| 8 | 1.26 | 84 | 0.66 | A | 1000 | 11.3 |

*comparative runs, without addition of catalyst

In Table I, the phosphorus-containing compounds added were as follows:
A: distearyl pentaerythritol diphosphite
B: bis (2,4 di-tert. butyl phenyl) pentaerythritol diphosphite
C: trioctadecyl phosphite The results show that the distearyl pentaerythritol diphosphite-, bis (2,4 di-tert. butyl phenyl) pentaerythritol diphosphite- and trioctadecyl phosphite-based catalysts gave improvements in both yield and colour of the grafted copolymer.

EXAMPLE II

The procedure of Example I was repeated using an ethylene/vinyl acetate copolymer having a vinyl acetate content of 28% and a melt index of 6 dg/min, except that the amount of maleic anhydride was 1.6% by weight and the catalyst was a 5% blend of bis (2,4 di-tert. butyl phenyl) pentaerythritol diphosphite and 0.3 parts by weight of water in the above copolymer.

TABLE II

| Run No. | Graft Amount (%) | Graft Yield (%) | Melt Index dg/min | Catalyst | Catalyst Amount (ppm) | Yellowness Index |
|---|---|---|---|---|---|---|
| 9* | 1.07 | 67 | 4.0 | no | — | 36.1 |
| 10* | 1.03 | 64 | 4.2 | no | — | 38.7 |
| 11 | 1.17 | 73 | 1.7 | yes | 1000 | 24.5 |
| 12 | 1.34 | 84 | 1.5 | yes | 1000 | 22.1 |

*comparative runs, without addition of catalyst

The results show an improvement in both graft yield and colour of the resultant grafted polymer.

EXAMPLE III

The procedure of Example I was repeated using an ethylene/vinyl acetate copolymer having a vinyl acetate content of 9% by weight and a melt index of 7.0 dg/min, except that the amount of maleic anhydride was 1.6% by weight, the amount of peroxide in the admixture was 1600 ppm and the catalyst was a 99.5:0.5 phosphorous acid:water mixture coated onto the same ethylene/vinyl acetate copolymer at a level of 0.5 % by weight.

The results obtained are given in Table III.

TABLE III

| Run No. | Graft Amount (%) | Graft Yield (%) | Melt Index dg/min | Catalyst | Catalyst Amount (ppm) | Yellowness Index |
|---|---|---|---|---|---|---|
| 13* | 1.10 | 69 | 3.2 | no | — | 46.0 |
| 14 | 1.25 | 78 | 2.0 | yes | 120 | 5.0 |

*comparative run without addition of catalyst.

The results show an improvement in both graft yield and colour of the resultant grafted polymer.

EXAMPLE IV

The procedure of Example III was repeated, except that the amount of maleic anhydride was 1.7% by weight, the amount of peroxide in the admixture was 1500 ppm and the catalyst was a 5% blend of tris nonyl phenyl phosphite in the same copolymer into which 4000 ppm of water was allowed to absorb over a period of five days.

The results obtained are given in Table IV.

TABLE IV

| Run No. | Graft Amount (%) | Graft Yield (%) | Melt Index dg/min | Catalyst | Catalyst Amount (ppm) | Yellowness Index (YI) |
|---|---|---|---|---|---|---|
| 15* | 1.13 | 66 | 2.9 | no | — | 55.9 |
| 16 | 1.30 | 76 | 2.2 | yes | 1000 | 6.1 |

*comparative run, without addition of catalyst

The results show an improvement in both graft yield and colour of the resultant grafted polymer.

EXAMPLE V

The procedure of Example II was repeated using an ethylene/vinyl acetate copolymer having a vinyl acetate of 18% by weight and a melt index of 8.0 dg/min, except that the amount of organic peroxide used was 1700 ppm and the amount of maleic anhydride used was 1.5% by weight. The catalyst was a 10:1 blend of bis (2,4 di-tert. butyl phenyl) pentaerythritol diphosphite:-water coated at a level of 2% by weight onto an ethylene/vinyl acetate copolymer having a vinyl acetate content of 9% by weight and a melt index of 2 dg/min.

The results obtained are given in Table V.

TABLE V

| Run No. | Graft Amount (%) | Graft Yield (%) | Melt Index dg/min | Catalyst | Catalyst Amount (ppm) | Yellowness Index |
|---|---|---|---|---|---|---|
| 17* | 0.96 | 64 | 4.3 | no | — | 48.8 |
| 18 | 1.27 | 85 | 2.9 | yes | 1000 | 33.7 |

*comparative runs, without addition of catalyst

The results show an improvement in both graft yield and the colour of the resultant grafted polymer.

EXAMPLE VI

The procedure of Example I was repeated to determine effects of use of phenolic antioxidants in place of or in addition to catalysts according to the invention. The polymer was an ethylene/vinyl acetate copolymer having a vinyl acetate content of 9% and a melt index of 2 dg/min. The amount of maleic anhydride used was 1.7% by weight and the organic peroxide was Lupersol in an amount of 1150 ppm. The catalyst was the one based on tris nonyl phenyl phosphite described in Example IV which, if added, was added in an amount of 800 ppm.

Further details and the results obtained are given in Table VI.

TABLE VI

| Run No. | Antioxidant Type*/ Amount (ppm) | Graft Amount (%) | Graft Yield (%) | Melt Index dg/min | Catalyst | Yellowness Index |
|---|---|---|---|---|---|---|
| 19* | BHT/80 | 1.30 | 76 | 1.09 | no | 45.6 |
| 20 | BHT/700 | 1.22 | 72 | 1.09 | no | 48.3 |
| 21 | BHT/700 | 1.52 | 89 | 0.73 | yes | 11.3 |
| 22 | BHT/80 | 1.60 | 94 | 0.78 | yes | 11.0 |
| 23 | BHT/80 | 1.39 | 82 | 1.13 | no | 48.5 |
| 24 | D/1000 | 1.24 | 73 | 1.10 | no | 57.7 |
| 25 | D/1000 | 1.56 | 92 | 0.78 | yes | 14.9 |

*BHT is 2,6-di-tert. butyl 4-methyl phenol
D is tetrakis-methylene-3-(3',5'-di-tert. butyl-4-hydroxy phenyl) propionate methane The results showed that the amount of 6-di-tert. butyl 4-methyl phenol antioxidant had little effect on either the grafting yield or colour of the grafted polymer. However, addition of catalyst, according to the invention, to polymer containing either of the levels of 2,6-di-tert. butyl 4-methyl phenol resulted in substantial improvement in grafting yield and a major improvement in the colour of the grafted polymer. The same result was obtained when the antioxidant was tetrakis-methylene-3-(3',5'-di-tert. butyl-4-hydroxy phenyl) propionate methane. Thus, the results show that (i) phenolic antioxidants may be present during the grafting reaction, and (ii) the catalysts of the present invention provide significant improvements in the grafting process.

EXAMPLE VII

The procedure of Example I was repeated using different levels of two different catalysts. Catalyst E was the tris nonyl phenyl phosphite-based catalyst used in Example IV, while Catalyst F was a 5% blend of tris (2,4 di-tert. butyl phenyl)phosphite in the same carrier polymer into which 2000 ppm (carrier polymer basis) of water was allowed to absorb over a period of five days.

The amount of maleic anhydride used was 1.7% by weight and the organic peroxide was Lupersol 101 in an amount of 1150 ppm.

60% by weight solution in water onto the pellets in the throat of the extruder.

The results obtained are given in Table IX.

TABLE IX

| Run No. | Copolymer VA (%) | Copolymer Melt Index dg/min | Catalyst Amount* (ppm) | Graft Amount (%) | Graft Yield (%) | Melt Index of Product dg/min | Yellowness of Product Index |
|---|---|---|---|---|---|---|---|
| 36 | 18 | 500 | 55 | 1.10 | 100 | 170 | 1.1 |
| 37 | 20 | 800 | 200 | 1.00 | 91 | 470 | 16.7 |
| 38 | 33 | 400 | 200 | 0.85 | 77 | 240 | 13.7 |
| 39 | 18 | 8.0 | 120 | 1.01 | 92 | 2.3 | 9.7 |
| 40 | 28 | 43 | 200 | 1.03 | 94 | 16 | 19.3 |
| 41 | 33 | 43 | 250 | 0.95 | 86 | 22 | 29.9 |

*$H_3PO_3$ basis
VA = vinyl acetate.

The results obtained are given in Table VII.

TABLE VII

| Run No. | Graft Amount (%) | Graft Yield (%) | Melt Index dg/min | Catalyst* | Catalyst Amount (ppm) | Yellowness Index |
|---|---|---|---|---|---|---|
| 26 | 1.23 | 72 | 1.12 | — | — | 43.1 |
| 27 | 1.53 | 90 | 0.93 | E | 150 | 21.7 |
| 28 | 1.59 | 94 | 0.73 | E | 250 | 11.7 |
| 29 | 1.60 | 94 | 0.80 | E | 500 | 9.1 |
| 30 | 1.47 | 86 | 0.84 | E | 1000 | 6.7 |
| 31 | 1.30 | 76 | 1.04 | F | 4000 | 11.1 |

The results show that the addition of low levels of tris nonyl phenyl phosphite catalyst result in significant improvements in, in particular, the colour of the grafted polymer. When tris (2,4 di-tert. butyl phenyl) phosphite was used as catalyst, significant improvements were obtained but at higher levels of catalyst.

EXAMPLE VIII

The procedure of Example VII was repeated using ethylene/methyl acrylate copolymer having a methyl acrylate content of 20% by weight and a melt index of 6 dg/min, except that the amount of peroxide used varied between 1200 and 1300 ppm. Two different catalysts were used; Catalyst G was based upon trioctadecyl phosphite and Catalyst H was based upon tris nonyl phenyl phosphite, both being prepared in the manner described in Example I.

Further details and the results obtained are given in Table VIII.

TABLE VIII

| Run No. | Graft Amount (%) | Graft Yield (%) | Melt Index dg/min | Catalyst Addition | Catalyst Amount (ppm) | Yellowness Index |
|---|---|---|---|---|---|---|
| 32* | 0.94 | 55 | 5.0 | — | — | 28.3 |
| 33 | 1.02 | 60 | 5.4 | G | 1250 | 14.2 |
| 34 | 1.39 | 82 | 4.2 | H | 1000 | 6.0 |
| 35* | 1.20 | 71 | 4.1 | — | — | 25.4 |

*comparative run without addition of catalyst

The results show that both catalysts are effective in improving the grafting reaction. This example also illustrates the process of the present invention with ethylene/methyl acrylate copolymers.

EXAMPLE IX

The procedure of Example V was repeated using a series of ethylene/vinyl acetate copolymers having vinyl acetate contents ranging from 18% to 33% and melt indices ranging from 8 to 800 dg/min, except that the amount of maleic anhydride was 1.1% and the catalyst was phosphorous acid. The catalyst was added as a The results show that the addition of low levels of phosphorous acid produces grafted polymer having exceptional colour and graft yield.

I claim:

1. A process for the grafting of ethylenically unsaturated monomers onto a copolymer in the presence of a catalyst, said monomers being selected from the group consisting of ethylenically unsaturated carboxylic acids, ethylenically unsaturated carboxylic acid anhydrides, ethylenically unsaturated carboxylic acid esters, ethylenically unsaturated carboxylic acid salts, ethylenically unsaturated carboxylic acid amides, ethylenically unsaturated carboxylic acid imides, and mixtures thereof, said copolymer being selected from the group consisting of copolymers of ethylene with at least one monomer selected from the group consisting of vinyl alkanoates, carbon monoxide, acrylic acid, methacrylic acid, acrylate esters and methacrylate esters, and mixtures thereof, and ionomers of such copolymers, and said catalyst being comprised of a mixture of (a) water and (b) at least one phosphorus-containing compound selected from the group consisting of (i) phosphorus compounds of the formula $HPO(OR_1)_2$, where each $R_1$ is independently selected from H, alkyl, aryl and alkaryl, (ii) phosphite compounds of the formula $P(OR_2)_3$, where each $R_2$ is independently selected from alkyl, aryl and alkaryl, (ii) phosphite compounds of the formula $(OR_3)P-O-RH_4-O-P(OR_5)_2$, where each of $R_3$, $R_4$ and $R_5$ is independently selected from alkyl, aryl and alkaryl, and (iv) di-substituted pentaerythritol diphosphites of the formula $(R_6O)P-O_2R_{PE}O_2-P(OR_7)$, which each of $R_6$ and $R_7$ is independently selected from alkyl, aryl and alkaryl and $O_2R_{PE}O_2$ represents the pentaerythritol moiety, the amount of water being about 0.1–10 parts by weight per part of phosphorus-containing compound, with the proviso that if the phosphorus-containing compound is phosphorous acid then the amount of water is 0.001–10 parts, said process comprising:

(i) admixing in an extruder the copolymer, the monomer, at least 15 ppm of the catalyst and 25–5000 ppm of an organic peroxide having a half-life of from about 1 minute to about 120 minutes at 150° C., at a temperature above the melting point of said copolymer for a period of time that is at least 4 times the half-life of the organic peroxide so as to obtain a uniform distribution of the monomer, the catalyst and the peroxide in the copolymer;

(ii) extruding the resultant grafted copolymer into a shaped article.

2. The process of claim 1 in which the ethylenically unsaturated acid and anhydride are maleic acid and maleic anhydride, respectively.

3. The process of claim 1 in which the catalyst is in the form of a concentrate in a polymer, said polymer being compatible with the copolymer.

4. The process of claim 1 in which the organic peroxide is selected from dicumyl peroxide, 2,5-dimethyl-2,5-di(t-butyl peroxy) hexane and 2,5-dimethyl-2,5-di(t-butyl peroxy) hexyne-3.

5. The process of claim 1 in which the amount of organic peroxide is in the range 100–2500 ppm.

6. The process of claim 5 in which the amount of organic peroxide is in the range 500–2000 ppm.

7. The process of claim 1 in which the amount of water is in the range of about 0.001–10 parts by weight.

8. The process of claim 7 in which the amount of water is in the range of about 0.01–1 parts by weight.

9. The process of claim 8 in which the amount of water is in the range of about 0.03–0.5 parts by weight.

10. The process of claim 1 in which the amount of phosphorus-containing compound is at least 120 ppm.

11. The process of claim 10 in which the amount of phosphorus-containing compound is in the range of 100–1000 ppm.

12. The process of claim 2 in which the phosphorus-containing compound is of the formula $HPO(OR_1)_2$, where each $R_1$ is independently selected from H, alkyl, aryl and alkaryl.

13. The process of claim 2 in which the catalyst is phosphorous acid.

14. The process of claim in which the phosphorus-containing compound is of the formula $P(OR_2)_3$, where each $R_2$ is independently selected from alkyl, aryl and alkaryl.

15. The process of claim 2 in which the phosphorus-containing compound is of the formula $(OR_3)_2P-O-R_4-O-P(OR_5)_2$, where each of $R_3$, $R_4$ and $R_5$ is independently selected from alkyl, aryl and alkaryl.

16. The process of claim 2 in which the phosphorus-containing compound is a di-substituted pentaerythritol diphosphite of the formula $(R_6O)P-O_2R_{PE}O_2-P(OR_7)$, where each of $R_6$ and $R_7$ is independently selected from alkyl, aryl and alkaryl and $O_2R_{PE}O_2$ represents the pentaerythritol moiety.

17. A grafted copolymer composition having 0.5 to 5% by weight of monomer grafted thereon, said copolymer being selected from the group consisting of copolymers of ethylene with at least one monomer selected from the group consisting of vinyl alkanoates, carbon monoxide, acrylic acid, methacrylic acid, acrylate esters and methacrylate esters, and mixtures thereof, and ionomers of such copolymers, and said monomer being selected from the group consisting of ethylenically unsaturated carboxylic acids, ethylenically unsaturated carboxylic acid anhydrides, ethylenically unsaturated carboxylic acid esters, ethylenically unsaturated carboxylic acid salts, ethylenically unsaturated carboxylic acid amides, ethylenically unsaturated carboxylic acid imides, and mixtures thereof, said grafted polymer having a melt index that is 20–140% of the melt index of the copolymer prior to grafting, said grafted copolymer having been formed by grafting the monomer onto molten copolymer in the presence of 25–5000 ppm of an organic peroxide having a half-life of from about 1 minute to about 120 minutes at 150° C. and at least 15 ppm of a catalyst comprised of a mixture of (a) water and (b) at least one phosphorus-containing compound selected from the group consisting of (i) phosphorus compounds of the formula $HPO(OR_1)_2$, where each $R_1$ is independently selected from H, alkyl, aryl and alkaryl, (ii) phosphite compounds of the formula $P(OR_2)_3$, where each $R_2$ is independently selected from alkyl, aryl and alkaryl, (iii) phosphite compounds of the formula $(OR_3)_2P-O-R_4-O-P(OR_5)_2$, where each of $R_3$, $R_4$ and $R_5$ is independently selected from alkyl, aryl and alkaryl, and (iv) di-substituted pentaerythritol diphosphites of the formula $(R_6O)P-O_2R_{PE}O_2-P(OR_7)$, where each of $R_6$ and $R_7$ is independently selected from alkyl, aryl and alkaryl and $O_2R_{PE}O_2$ represents the pentaerythritol moiety, the amount of water being about 0.1–10 parts by weight per part of phosphorus-containing compound, with the proviso that if the phosphorus-containing compound is phosphorous acid then the amount of water is 0.001–10 parts.

18. The grafted polymer of claim 17 in which the ethylenically unsaturated acid and anhydride are maleic acid and maleic anhydride, respectively.

* * * * *

UNITED STATES PATENT AND TRADEMARK OFFICE
CERTIFICATE OF CORRECTION

PATENT NO. : 5,106,916
DATED : April 21, 1992
INVENTOR(S) : David John Mitchell It is certified that error appears in the above-identified patent and that said Letters Patent is hereby corrected as shown below:

Column 10, line 45, delete "(ii)" and insert in place thereof --(iii)--

Column 10, line 53, delete "0.1" and insert in place thereof --0.01--

Column 11, line 33, after the word "claim", insert --2--

Column 12, line 39, delete "0.1" and insert in place thereof --0.01--

Signed and Sealed this

Seventh Day of September, 1993

Attest:

BRUCE LEHMAN

*Attesting Officer*     *Commissioner of Patents and Trademarks*